Feb. 2, 1932. E. A. SPERRY Re. 18,344
METHOD OF REFINING OIL
Original Filed Sept. 21, 1925
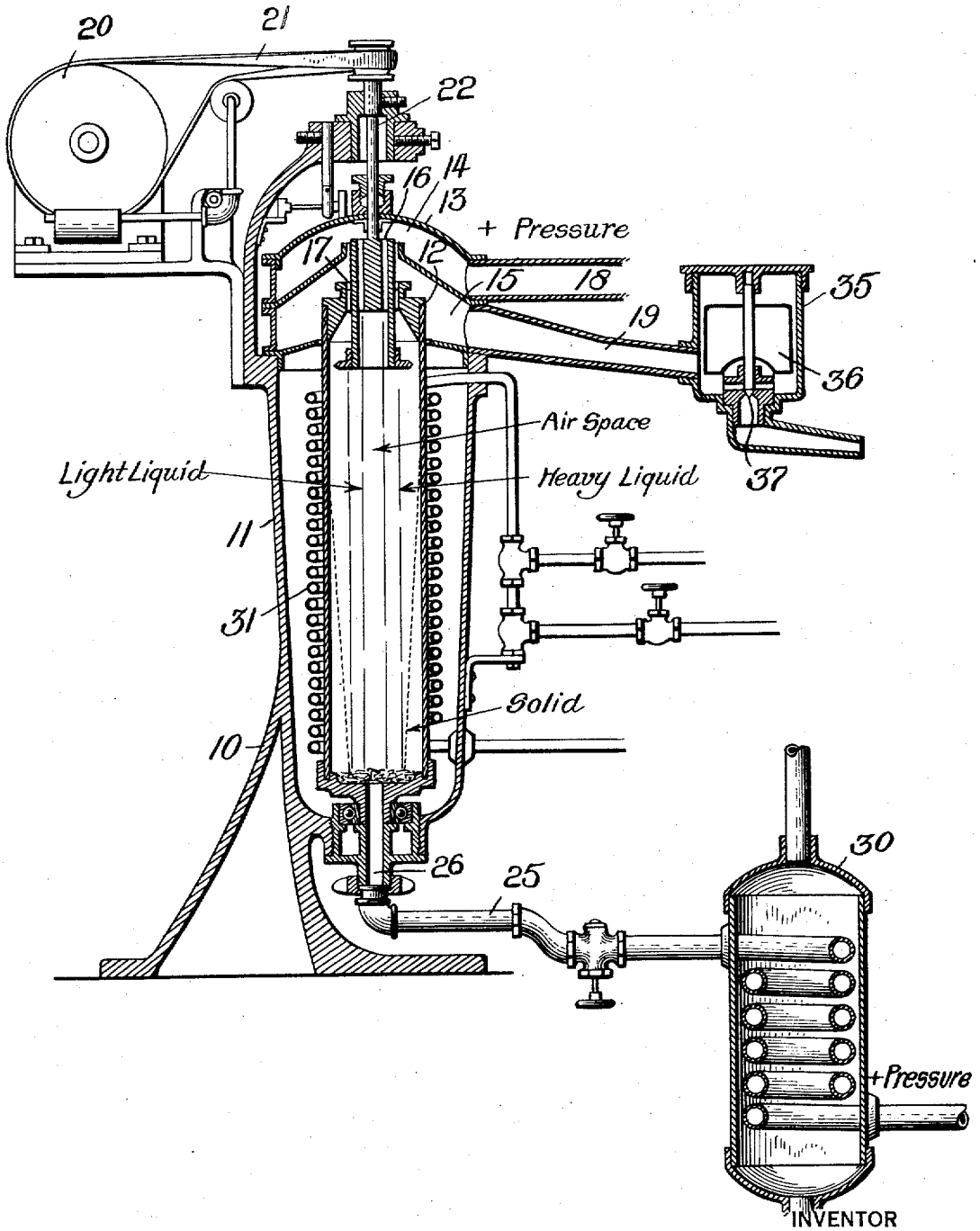
INVENTOR
ELMER A. SPERRY.
BY
Herbert H. Thomson
ATTORNEY.

Reissued Feb. 2, 1932

Re. 18,344

UNITED STATES PATENT OFFICE

ELMER A. SPERRY, OF BROOKLYN, NEW YORK, ASSIGNOR TO SPERRY DEVELOPMENT COMPANY, A CORPORATION OF DELAWARE

METHOD OF REFINING OIL

Original No. 1,699,379, dated January 15, 1929, Serial No. 57,674, filed September 21, 1925. Application for reissue filed May 25, 1929. Serial No. 366,075.

This invention relates to a method and means for refining crude or bunker oil as it is needed for use in such devices as Diesel engines. Hitherto, the advantage of steam boilers over Diesel engines in ship's propulsion lay in the fact that the former could burn crude fuel while the latter required fuel of a certain degree of refinement. By my invention crude fuel may be employed for operating a Diesel ship, because I provide means for refining said fuel on board ship prior to use. My invention utilizes several principles, among which are the revolving of the oil in a centrifugal machine accompanied by change in temperature, either heating or cooling. I have found that by this means the separation of impurities and substances either solids or liquids heavier than the refined oil was facilitated.

Other objects and advantages of my invention will become apparent in the following detailed description thereof.

The accompanying drawing is a front elevation, partly sectioned vertically, of an assembly embodying my invention.

Referring to the drawing, I have disclosed as one means of refining the fuel a centrifugal machine which may be of some well known type, comprising for example, the standard or bracket 10 supporting the casing 11, which may be formed integral therewith. Within said casing is journaled for rotation upon a vertical axis the bowl 12 adapted to contain the fuel to be broken up and journaled at its upper and lower ends in suitable bearings. The casing 11 is shown closed at the top by a cover 13 which may be subdivided into compartments 14—15, the former cooperating with openings 16 and the latter with an opening 17 leading into the bowl into which compartments the separated fluids of different specific gravities collect for discharge through the nozzles 18 and 19. The bowl may be driven by means of a motor 20 and suitable belting 21 adapted to drive a spindle 22 connected to the bowl 12. The crude fuel may enter the bottom of the bowl by means of a supply pipe 25 and inlet 26 extending into the bowl. It will be understood that in centrifuging the liquid the heavier portions thereof will tend to collect at correspondingly greater distances from the center while the lighter portions will remain substantially at or near the center. The lighter portions of the centrifuged fluid will pass upwardly through orifices 16 to compartment 14, while the heavier fluids will pass through orifice 17 into compartment 15. The solid particles will, of course, collect at the bottom of the bowl.

To facilitate the refining of the crude fuel, I may utilize the principle of changing the temperature thereof substantially during the centrifuging process. Thus I may pass the crude fuel through a cooler 30 and thence into the bowl which I may surround by a steam heating coil 31 so that a substantial rise in temperature occurs while the fuel is being refined.

If desired the casing 30 may be a superheater and the coil 31 a cooling system, such as brine pipes, in which case the separation of impurities and refining of the fuel would be facilitated as in the case where the casing 30 is a cooler and pipes 31 a heating coil.

The above description presents one form of my invention wherein I have utilized the principle that a change of temperature while the liquid is being subjected to internal centrifugal stress of a very high order definitely facilitates the disengaging or the unlocking of the associated particles and their ultimate separation.

In devices of the kind described, there is a tendency for the oil to vaporize due to the large centrifugal stress, especially when accompanied by high temperature, as in one form of the device described. Further, the product tends to come off in a frothy condition which is frequently very slow in settling and being converted into homogeneous oil. If immediate use of the oil is desired, this is found impossible for suitable pumping on account of the large quantities of froth present. To overcome both of the above-named difficulties, I may utilize a type of centrifuging machine wherein the discharges are held under super-atmospheric pressure to any desired degree of gage pressure and my invention extends to the use of this method and equipment. As shown, the incoming crude fuel is supplied under pressure and the discharged fluid is also maintained under pressure. This may be the pressure maintained in a reservoir to which the light liquid is led, or the said light liquid may be discharged sufficiently beneath the surface of the accumulated fluid in the reservoir to maintain it under pressure. To prevent relief of pressure by way of the discharge 15 through which the heavy liquid, which under suitable conditions of temperature and pressure may even be water, discharges, I may provide the pressure valve shown in the drawing. This valve may comprise a cylinder 35 having a float 36 therein guided for vertical reciprocal movement and having a needle valve 37 at its lower end. The float is so designed that it requires an accumulation of fluid in cylinder 35 to a certain height before the said float is lifted to open valve 37 and permit a certain quantity of liquid to discharge. When the liquid falls below the predetermined level, valve 37 will close so that at all times there is maintained within cylinder 35 a sufficient quantity of fuel to maintain the pressure within the centrifugal system and prevent reduction thereof to atmospheric pressure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of refining crude fuel oil consisting in centrifuging under pressure and simultaneously heating the same.

2. The method of refining crude fuel oil consisting in centrifuging under pressure and simultaneously heating the same and maintaining the discharged fluid under pressure.

3. The method of refining crude fuel oil consisting in centrifuging under sufficient pressure to overcome objectionable vaporization and simultaneously heating the same.

4. The method of refining crude fuel oil consisting in centrifuging and simultaneously heating the same and maintaining the discharged fluids under sufficient pressure to prevent frothing.

5. The method of refining crude fuel oil consisting in centrifuging under sufficient pressure to overcome objectionable vaporization and simultaneously heating the same and maintaining the discharged fluids under sufficient pressure to prevent frothing.

In testimony whereof I hereby affix my signature.

ELMER A. SPERRY.